United States Patent
Dillon

(10) Patent No.: US 12,417,094 B2
(45) Date of Patent: Sep. 16, 2025

(54) TECHNIQUES FOR DYNAMICALLY TRANSLATING FIELDS USING A GENERATIVE LANGUAGE MODEL

(71) Applicant: OKTA, INC., San Francisco, CA (US)

(72) Inventor: Patrick Anthony Dillon, Durham, NC (US)

( * ) Notice: Subject to any disclaimer, the term of this patent is extended or adjusted under 35 U.S.C. 154(b) by 242 days.

(21) Appl. No.: 18/361,498

(22) Filed: Jul. 28, 2023

(65) Prior Publication Data

US 2025/0036404 A1  Jan. 30, 2025

(51) Int. Cl.
*G06F 8/73* (2018.01)
*G06F 8/40* (2018.01)

(52) U.S. Cl.
CPC . *G06F 8/73* (2013.01); *G06F 8/40* (2013.01)

(58) Field of Classification Search
CPC ..................................... G06F 8/40; G06F 8/73
USPC ................. 717/101–109, 120–123, 136–137
See application file for complete search history.

(56) References Cited

U.S. PATENT DOCUMENTS

| | | | | |
|---|---|---|---|---|
| 7,305,656 B2* | 12/2007 | Fish | .......................... | G06F 8/20 |
| | | | | 717/121 |
| 8,484,218 B2* | 7/2013 | Raghunath | .............. | G06F 40/44 |
| | | | | 707/769 |
| 8,489,980 B2* | 7/2013 | Lakritz | .................... | G06F 40/40 |
| | | | | 715/239 |
| 10,007,664 B2* | 6/2018 | Donabedian | .......... | H04L 67/535 |
| 10,614,172 B2* | 4/2020 | Shin | ..................... | G06Q 10/107 |
| 10,803,045 B2* | 10/2020 | Raghavan | ............. | G06F 40/177 |
| 11,687,732 B2* | 6/2023 | Shi | ........................ | G06F 40/216 |
| | | | | 704/2 |
| 12,019,609 B2* | 6/2024 | Raghavan | ............. | G06F 3/0482 |
| 12,032,808 B2* | 7/2024 | Govind | ................. | G06F 3/0482 |
| 2010/0070852 A1* | 3/2010 | Li | ......................... | G06F 16/958 |
| | | | | 715/239 |
| 2016/0110346 A1* | 4/2016 | Lieske | .................... | G06F 40/40 |
| | | | | 704/8 |

FOREIGN PATENT DOCUMENTS

WO  WO-2023198725 A1 * 10/2023 ............. G06F 16/20

* cited by examiner

*Primary Examiner* — Ted T. Vo
(74) *Attorney, Agent, or Firm* — Holland & Hart LLP

(57) ABSTRACT

A method of data processing is described. The method includes receiving an indication of a content entry and a designated language for translation of fields in the content entry. The method further includes determining that a first subset of the fields are associated with a first type and a second subset of the fields are associated with a second type based on a source code structure associated with the content entry. The method further includes obtaining a first set of string values from the first subset of fields and a second set of string values from the second subset of fields based on iterating through the source code structure. The method further includes translating the fields to the designated language based on using a generative language model to process the first set of string values and the second set of string values.

20 Claims, 9 Drawing Sheets

TECHNIQUES FOR DYNAMICALLY TRANSLATING FIELDS USING A GENERATIVE LANGUAGE MODEL

FIELD OF TECHNOLOGY

The present disclosure relates generally to data processing, and more specifically to dynamically translating fields using a generative language model.

BACKGROUND

In some computing systems, an identity management platform may support user authentication, authorization, and access control for various third-party applications and services. In some implementations, employees or administrative users of the identity management platform may use a content management system to create, publish, and/or update content items (such as articles, entries, posts, and the like). The content management system may support multilingual content, enabling users to create and manage localized content for different languages and/or locales. However, to implement translated content delivery, administrators may have to manually input the translated content or purchase an integration that leverages third-party translation service(s). Thus, current methods of creating multilingual content may be expensive, manually intensive, time-consuming, and error prone.

SUMMARY

A method for data processing at a dynamic content translation service is described. The method includes: receiving an indication of a content entry associated with a content management system, multiple fields within the content entry, and a designated language for translation of the multiple fields within the content entry; determining that the multiple fields include a first set of fields associated with a first field type and a second set of fields associated with a second field type based on a source code structure associated with the content entry that includes the multiple fields; obtaining a first set of source code string values from the first set of fields and a second set of source code string values from the second set of fields based on iterating through the source code structure associated with the content entry that includes the multiple fields; and translating the first set of fields and the second set of fields to the designated language based on using a generative language model to process the first set of source code string values obtained from the first set of fields and the second set of source code string values obtained from the second set of fields.

An apparatus for data processing at a dynamic content translation service is described. The apparatus includes one or more memories storing processor-executable code, and one or more processors coupled with the one or more memories. The one or more processors are individually or collectively operable to execute the code to cause the apparatus to: receive an indication of a content entry associated with a content management system, multiple fields within the content entry, and a designated language for translation of the multiple fields within the content entry; determine that the multiple fields include a first set of fields associated with a first field type and a second set of fields associated with a second field type based on a source code structure associated with the content entry that includes the multiple fields; obtain a first set of source code string values from the first set of fields and a second set of source code string values from the second set of fields based on iterating through the source code structure associated with the content entry that includes the multiple fields; and translate the first set of fields and the second set of fields to the designated language based on using a generative language model to process the first set of source code string values obtained from the first set of fields and the second set of source code string values obtained from the second set of fields.

Another apparatus for data processing at a dynamic content translation service is described. The apparatus includes: means for receiving an indication of a content entry associated with a content management system, multiple fields within the content entry, and a designated language for translation of the multiple fields within the content entry; means for determining that the multiple fields include a first set of fields associated with a first field type and a second set of fields associated with a second field type based on a source code structure associated with the content entry that includes the multiple fields; means for obtaining a first set of source code string values from the first set of fields and a second set of source code string values from the second set of fields based on iterating through the source code structure associated with the content entry that includes the multiple fields; and means for translating the first set of fields and the second set of fields to the designated language based on using a generative language model to process the first set of source code string values obtained from the first set of fields and the second set of source code string values obtained from the second set of fields.

A non-transitory computer-readable medium storing code for data processing at a dynamic content translation service is described. The code includes instructions executable by one or more processors to: receive an indication of a content entry associated with a content management system, multiple fields within the content entry, and a designated language for translation of the multiple fields within the content entry; determine that the multiple fields include a first set of fields associated with a first field type and a second set of fields associated with a second field type based on a source code structure associated with the content entry that includes the multiple fields; obtain a first set of source code string values from the first set of fields and a second set of source code string values from the second set of fields based on iterating through the source code structure associated with the content entry that includes the multiple fields; and translate the first set of fields and the second set of fields to the designated language based on using a generative language model to process the first set of source code string values obtained from the first set of fields and the second set of source code string values obtained from the second set of fields.

In some examples of the methods, apparatuses, and non-transitory computer-readable media described herein, obtaining the second set of source code string values includes operations, features, means, or instructions for recursively iterating through one or more nodes within the source code structure of the content entry that includes the multiple fields, the one or more nodes including multiple sub-nodes which collectively include the second set of source code string values.

In some examples of the methods, apparatuses, and non-transitory computer-readable media described herein, at least the first set of source code string values and the second set of source code string values are editable within the content entry after the first set of fields and the second set of fields are translated to the designated language.

In some examples of the methods, apparatuses, and non-transitory computer-readable media described herein, translating the second set of fields to the designated language may include operations, features, means, or instructions for generating, for a first node in the source code structure of the content entry, a one-dimensional string array of source code string values obtained from sub-nodes of the first node.

In some examples of the methods, apparatuses, and non-transitory computer-readable media described herein, the first node includes one or more image pointers, code blocks, or virtual resource identifiers that are unaltered after translation.

In some examples of the methods, apparatuses, and non-transitory computer-readable media described herein, translating the second set of fields may include operations, features, means, or instructions for transmitting a message that includes the one-dimensional string array of source code string values obtained from sub-nodes of the first node within the source code structure of the content entry.

In some examples of the methods, apparatuses, and non-transitory computer-readable media described herein, the message includes a plain text prompt that instructs the generative language model to translate the one-dimensional string array of source code string values to the designated language.

Some examples of the methods, apparatuses, and non-transitory computer-readable media described herein may further include operations, features, means, or instructions for including an empty string array in a call to the generative language model based on determining that at least one node includes zero (0) source code string values.

Some examples of the methods, apparatuses, and non-transitory computer-readable media described herein may further include operations, features, means, or instructions for: splitting at least one source code string value into two or more blocks based on a size of the at least one source code string value and a processing limit of the generative language model; and including the two or more blocks in separate calls to the generative language model.

In some examples of the methods, apparatuses, and non-transitory computer-readable media described herein, translating the first set of fields and the second set of fields may include operations, features, means, or instructions for: receiving a first set of messages including the first set of source code string values translated to the designated language; and receiving a second set of messages including the second set of source code string values translated to the designated language, where the first set of source code string values and the second set of source code string values are translated using the generative language model.

In some examples of the methods, apparatuses, and non-transitory computer-readable media described herein, the second set of messages includes multiple one-dimensional string arrays which includes translations of the second set of source code string values.

In some examples of the methods, apparatuses, and non-transitory computer-readable media described herein, a one-dimensional string array of the multiple one-dimensional string arrays corresponds to a node within a field of the second field type, and each element of the one-dimensional string array includes a translation of a source code string value obtained from a sub-node of the node.

Some examples of the methods, apparatuses, and non-transitory computer-readable media described herein may further include operations, features, means, or instructions for: generating a duplicate node based on metadata associated with the field including the node; and sequentially inserting translated source code string values from the one-dimensional string array into corresponding sub-nodes of the duplicate node based on recursively iterating through the corresponding sub-nodes of the duplicate node.

Some examples of the methods, apparatuses, and non-transitory computer-readable media described herein may further include operations, features, means, or instructions for receiving, from a device, a request to store the content entry after the first set of fields and the second set of fields are translated to the designated language.

Some examples of the methods, apparatuses, and non-transitory computer-readable media described herein may further include operations, features, means, or instructions for generating two or more versions of the content entry based on translating the multiple fields to multiple languages associated with different locales.

Some examples of the methods, apparatuses, and non-transitory computer-readable media described herein may further include operations, features, means, or instructions for: receiving, from a device associated with a client of the content management system, a request for the content entry; and returning one of the two or more versions of the content entry to the device based on a locale of the client.

BRIEF DESCRIPTION OF THE DRAWINGS

FIGS. 3A and 3B show examples of a user interface that supports techniques for dynamically translating fields using a generative language model in accordance with aspects of the present disclosure.

DETAILED DESCRIPTION

Figure 1:
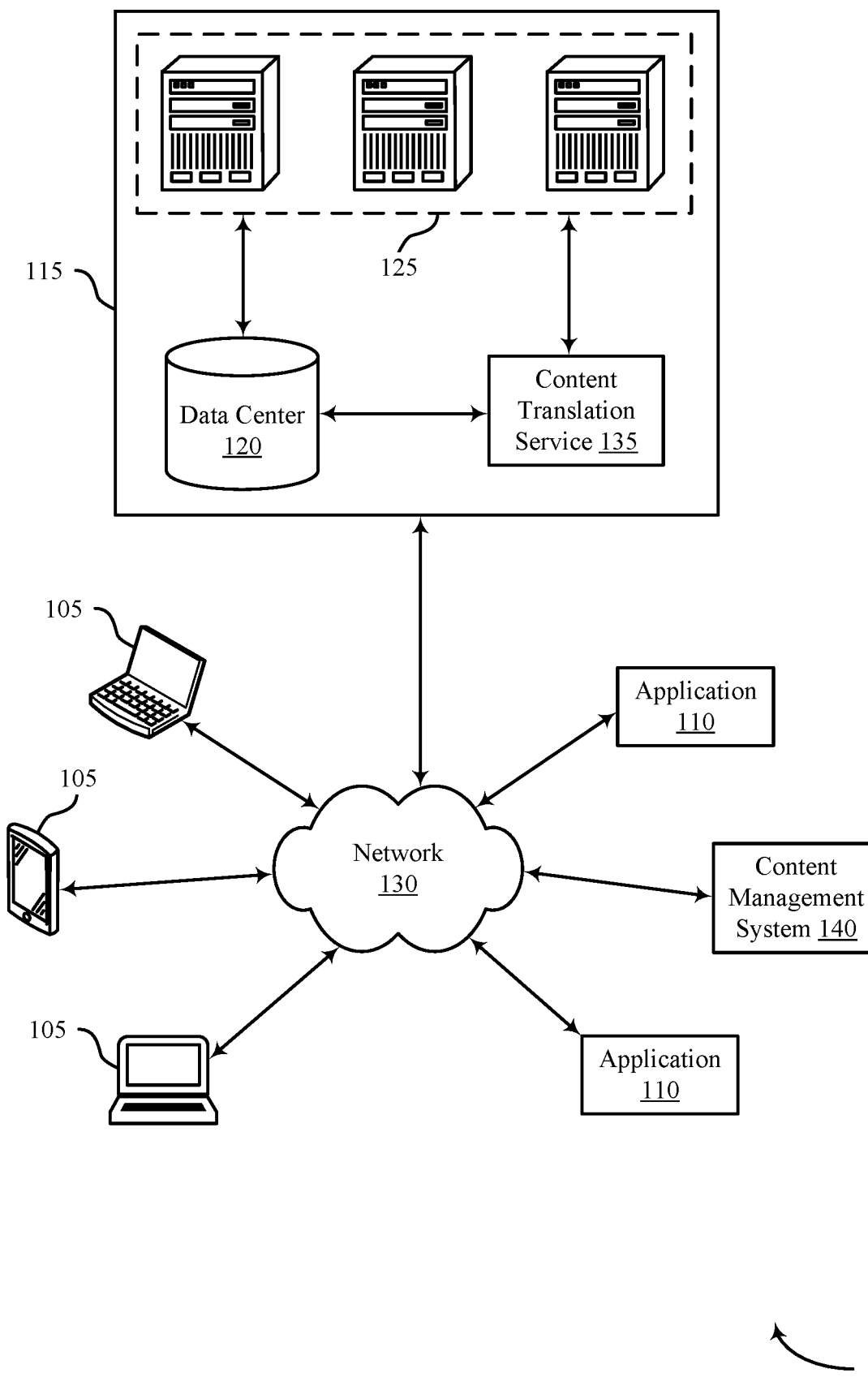
FIGS. 1 and 2 illustrate examples of systems that support techniques for dynamically translating fields using a generative language model in accordance with aspects of the present disclosure.

In some computing systems, an identity management platform may support user authentication, authorization, and access control for various third-party applications and services. The identity management platform may provide secure and seamless access to both employees and customers of an organization. The identity management platform may enable such organizations to manage user identities, authentication, and authorization across many applications and devices. The identity management platform may centralize the management of user accounts, permissions, and security policies, making it easier for organizations to control and monitor access to their resources. In some implementations, employees or administrative users of the identity management platform may use a content management system to create, publish, and/or update technical documentation, such as articles that describe the use, functionality, or architecture of a product, system, or service provided by the identity management platform.

The content management system may support content modeling, creation, management, delivery, multi-platform distribution, localization, and other integrations. For example, the content management system may enable users to create a content schema by defining content types that serve as templates for different content entries (e.g., blog posts, products, articles). Each content type includes fields that represent various elements of a particular content item (e.g., title, body, images). The content management system may also support multilingual content, enabling users to create and manage localized content for different languages and/or locales. However, to implement translated content delivery, administrators may have to manually input the translated content or purchase an integration that leverages third-party translation service(s). Thus, current methods of creating multilingual content may be expensive, manually intensive, time-consuming, and error prone.

The techniques described herein generally provide for an integration that dynamically translates English-based content into different languages using a generative language model (such as ChatGPT). In accordance with one or more aspects of the present disclosure, a dynamic content translation service of an identity management platform may receive, via a command line interface, an indication of fields associated with a content entry of a content management system and a designated language for translation of the fields within the content entry. The dynamic content translation service may determine that a first subset of the fields are associated with a first field type and a second subset of the fields are associated with a second field type based on a source code structure associated with the content entry. The dynamic content translation service may obtain a first set of source code string values from the first subset of fields and a second set of source code string values from the second subset of fields based on iterating through the source code structure associated with the content entry. The content management service may translate the fields of the content entry to the designated language based on using a generative language model to process the first set of source code string values obtained from the first subset of fields and the second set of source code string values obtained from the second subset of fields.

In some implementations, the first field type may correspond to a plain text field, and the second field type may correspond to a rich text field. The dynamic content translation service may obtain the second set of source code string values (such as a collection of text fragments) from the rich text fields by recursively iterating through one or more nodes within the source code structure of the rich text fields. The one or more nodes may include sub-nodes (also referred to as content objects) which collectively include the second set of source code string values. The dynamic content translation service may extract the second set of source code string values from the sub-nodes, aggregate the second set of source code string values into a one-dimensional array, and pass the one-dimensional array to the generative language model via one or more application programming interface (API) calls. The generative language model may return a corresponding one-dimensional array of translated text fragments corresponding to the second set of source code string values.

Particular aspects of the subject matter described in this disclosure can be implemented to realize one or more of the following potential advantages. The techniques described herein may enable users of a content management system to dynamically translate source code string values (such as text strings) within fields of a content entry, while preserving the underlying format and structure of the content entry. For example, the dynamic content translation service described herein may selectively translate complex field types (such as rich text fields) in such a way that all pointers to images, code blocks, and/or links within the fields are preserved in their original form. Also, the described techniques may enable users of the content management system to edit the translated text before the associated content entry is saved or published, thereby providing users with the option to modify or update the translated text as needed.

Aspects of the disclosure are initially described in the context of systems, user interfaces, and process flows. Aspects of the disclosure are further illustrated by and described with reference to apparatus diagrams, system diagrams, and flowcharts that relate to techniques for dynamically translating fields using a generative language model.

FIG. 1 illustrates an example of a system 100 that supports techniques for dynamically translating fields using a generative language model in accordance with various aspects of the present disclosure. The system 100 includes applications 110, client devices 105, an identity management platform 115, a network 130, and a content management system 140. The identity management platform 115 may communicate with one or more of the client devices 105, applications 110, or the content management system 140 via the network 130 (such as a public or private network).

The network 130 may implement (i.e., utilize) transfer control protocol and internet protocol (TCP/IP), such as the Internet, or may implement other network protocols. The network 130 represents a communication pathway between the identity management platform 115, the client devices 105, the content management system 140, and the applications 110. In one example, the network 130 may use standard wireless and/or wired communications technologies and protocols. In another example, entities on the network 130 can use custom and/or dedicated data communication technologies.

A client device 105 may include one or more computers that enable a user to access various applications 110. A client device 105 can include, for example, a desktop computer, a laptop computer, a tablet computer, or a smart phone. A client device 105 may include one or more application modules, which enable the client device 105 to access a particular application 110. For example, an application module of a client device 105 may interact with an application 110 to log in to a user account of the application 110 (e.g., using a username/password combination). After logging in, the application module of the client device 105 can interact with the application 110 to access various services of the application 110. In some examples, the application module is a native application that is configured to run on an operating system (OS) of the client device 105. In other examples, the application module is a plugin for a web browser of the client device 105. In some other examples, the application module is a link to a webpage associated with the application 110.

An application 110 generally refers to any system, application, or service that is protected by or otherwise accessible via the identity management platform 115. An application 110 may be hosted or supported by any number of virtual and/or physical machines, such as servers 125, databases, smartphones, laptops, desktop computers, tablets, or other computing devices/systems capable of interacting with the identity management platform 115. In some examples, an application 110 may be a business, enterprise, non-profit, startup, or website that uses the identity management platform 115 to manage user information associated with client devices 105 (i.e., customers or contacts of the client system).

An application 110 may be, for example, a cloud-based application service, a web-based application service, a network-based application service, an on-premises application, an enterprise application, a consumer application, or a custom-built internal application. The application 110 may provide an application programming interface (API) that is usable by external systems (such as client devices 105) to interact with the application 110. In some implementations, the identity management platform 115 can use an API provided by an application 110 to log into a user account of the application 110. An application 110 may interact with one or multiple client devices 105 via the network 130. An application 110 may use the identity management platform 115 to store, manage, and process the data associated with the client devices 105. In some cases, an application 110 may have an associated security or permission level. An application 110 may have access to certain applications, data, and/or database information within the identity management platform 115 based on the associated security or permission level of the application 110, and may not have access to others.

The identity management platform 115 may support authentication services for applications 110. The identity management platform 115 may be configured to or otherwise capable of managing user accounts of various services provided by applications 110. For example, the identity management platform 115 may create user accounts for various third-party services, configure the accounts with usernames and passwords, and modify, deactivate, and/or delete the accounts as needed. The identity management platform 115 may support single sign-on (SSO) by serving as an identity provider (IdP) for one or more client systems (SPs), such as applications 110. For example, a user can authenticate by logging into the identity management platform 115 via a client device 105. The identity management platform 115 may then provide the client device 105 with a single portal from which the user can access various applications 110 and services without entering additional information (such as a username/password combination). For example, the user can interact with the portal to specify a particular third-party service, and the client device 105 can notify the identity management platform 115 accordingly.

The identity management platform 115 may access the appropriate authentication information (stored within the data center 120) and use it to log into the user's account for the specified third-party service or application 110. For example, in response to the user launching an SSO-integrated application (e.g., an application module) via the client device 105, the identity management platform 115 may automatically provide the relevant authentication information to the corresponding application 110. In one example, the identity management platform 115 may provide the relevant authentication information by inserting the information into the appropriate form fields of the application's sign-on screen(s) and executing a "sign-in" command. In another example, the identity management platform 115 may provide SSO services by interacting with an application 110 via an API provided by the application 110.

The identity management platform 115 may provide secure user authentication and authorization for various applications 110 and client devices 105. The identity management platform 115 may simplify the management of user identities and their access to different resources within an organization. When a user joins an organization, their information (e.g., name, email address, username) is entered into the identity management platform 115. As described herein, the identity management platform 115 may support SSO, enabling users to access multiple applications 110 with a single set of credentials. Users can log in to the identity management platform 115 (e.g., via a client device 105) with their username and password, and access all their authorized applications 110 without having to enter their credentials again.

The identity management platform 115 may also provide various authentication services, including username and password, multi-factor authentication (MFA), and social login. MFA adds an extra layer of security by prompting users to provide additional verification, such as a code from a mobile app or a fingerprint scan. The identity management platform 115 can act as a central user directory, storing user profiles and their attributes in a data center 120. The identity management platform 115 can integrate with existing directories using Active Directory (AD) or Lightweight Directory Access Protocol (LDAP), ensuring a centralized source of user information.

The identity management platform 115 may be configured to or otherwise capable of integrating with a wide range of applications 110, both cloud-based and on-premises. The identity management platform 115 may support various protocols like Security Assertion Markup Language (SAML) and OpenID Connect (OIDC), enabling secure communication between the identity management platform and the associated software applications 110. The identity management platform 115 may enable administrators to define policies and rules to control user access to resources. Administrators can set permissions based on factors like user roles, groups, and attributes.

The identity management platform 115 can automate user lifecycle management tasks such as provisioning, deprovisioning, and user updates. When a user joins or leaves an organization, their access to applications 110 and resources can be automatically granted or revoked, reducing administrative overhead. Additionally, or alternatively, the identity management platform 115 may provide security features to protect user identities and data. For example, the identity management platform 115 may support encryption, threat detection, and monitoring capabilities to ensure the integrity and confidentiality of user information. The identity management platform 115 may also help organizations comply with various regulatory requirements.

The identity management platform 115 may, in some implementations, include servers 125. In some cases, the servers 125 may be integrated with or otherwise connected to the data center 120. The data center 120 may include one or multiple servers 125. The servers 125 may be used for data storage, management, and/or processing. The data center 120 may communicate with other components of the identity management platform 115 via a network connection. The data center 120 may leverage redundancy for security purposes. In some cases, data stored at the data center 120 may be backed up by copies of the data at another data center 120. In some cases, data processing may occur at any of the components of the identity management platform 115, or at a combination of these components. In some cases, servers 125 may perform the data processing.

The content management system 140 may include one or more virtual/physical machines, servers 125, databases, smartphones, laptops, desktop computers, tablets, or other computing devices/systems. The content management system 140 may be implemented as a cloud-based application service, a web-based application service, a network-based application service, an on-premises application, an enterprise application, a consumer application, or a custom-built internal application, among other examples. The content management system 140 may enable developers and other users (such as employees or administrators of the identity management platform 115) to create, manage, and distribute content across various platforms and channels. For example, a software developer associated with the identity management platform 115 may use the content management system 140 to create, publish, and/or update technical documentation (i.e., articles that describe the use, functionality, or architecture of a product, system or service of the identity management platform 115). The content management system 140 may support content modeling, creation, management, delivery, multi-platform distribution, localization, and other integrations.

As an example, a user (such as an employee of the identity management platform 115) may interact with the content management system 140 (e.g., via a client device 105) to define a source code structure (such as a content model) for a particular content entry. The user may configure a content schema by defining content types, which serve as templates for different types of content (e.g., blog posts, products, articles). Each content type includes fields that represent various elements of the content entry (e.g., title, body, images). Once the source code structure is set up, users can generate content by filling in the fields defined in the content types. They can add text, images, videos, and any other form of media.

The content management system 140 provides a user-friendly web interface for content management, and may enable users to easily create, edit, and organize content without technical expertise. Users can also schedule content publishing and manage versioning. The content management system 140 may have a headless content management system architecture, meaning that content is decoupled from the presentation layer, thereby enabling developers to fetch content through APIs and display content on various platforms and devices. Content can be delivered via APIs (such as RESTful APIs or GraphQL APIs), enabling seamless integration with websites, mobile apps, Internet of Things (IoT) devices, and more. Since content is accessed through APIs, users can publish content across multiple platforms simultaneously, which makes it easier to maintain content consistency across different channels like websites, mobile apps, voice assistants, etc.

The content management system 140 may support a wide range of integrations with third-party tools and services like analytics, marketing automation, e-commerce platforms, etc. These integrations enable users to extend the capabilities of the content management system 140 and streamline their content workflow. The content management system 140 may also support multilingual content, enabling users to create and manage content in different languages, which can be useful for organizations with a global audience. The content management system 140 may support translated content delivery, but administrators may have to manually input the translated content or purchase an integration that leverages third-party translation service(s).

The dynamic content translation service 135 may be individually or collectively provided by one or more virtual/physical machines, servers 125, databases, smartphones, laptops, desktop computers, tablets, or computing devices associated with the identity management platform 115. The techniques described herein generally relate to using the dynamic content translation service 135 of the identity management platform 115 to translate English-based content into different languages. In some implementations, users of the identity management platform 115 may interact with the dynamic content translation service 135 via a command line interface. The dynamic content translation service 135 may communicate with the content management system 140 via a content management API provided by the content management system 140. Additionally, or alternatively, the dynamic content translation service 135 may communicate with a generative language model (such as the generative language model 210 shown and described with reference to FIG. 2) via an API provided by the generative language model.

It should be appreciated by a person skilled in the art that one or more aspects of the disclosure may be implemented in a system 100 to solve additional or alternative problems (other than those described above). Furthermore, aspects of the disclosure may provide technical improvements to "conventional" systems or processes described herein. However, the description and appended drawings only include example technical improvements resulting from implementing aspects of the disclosure and, accordingly, do not represent all of the technical improvements provided within the scope of the claims.

Figure 2:
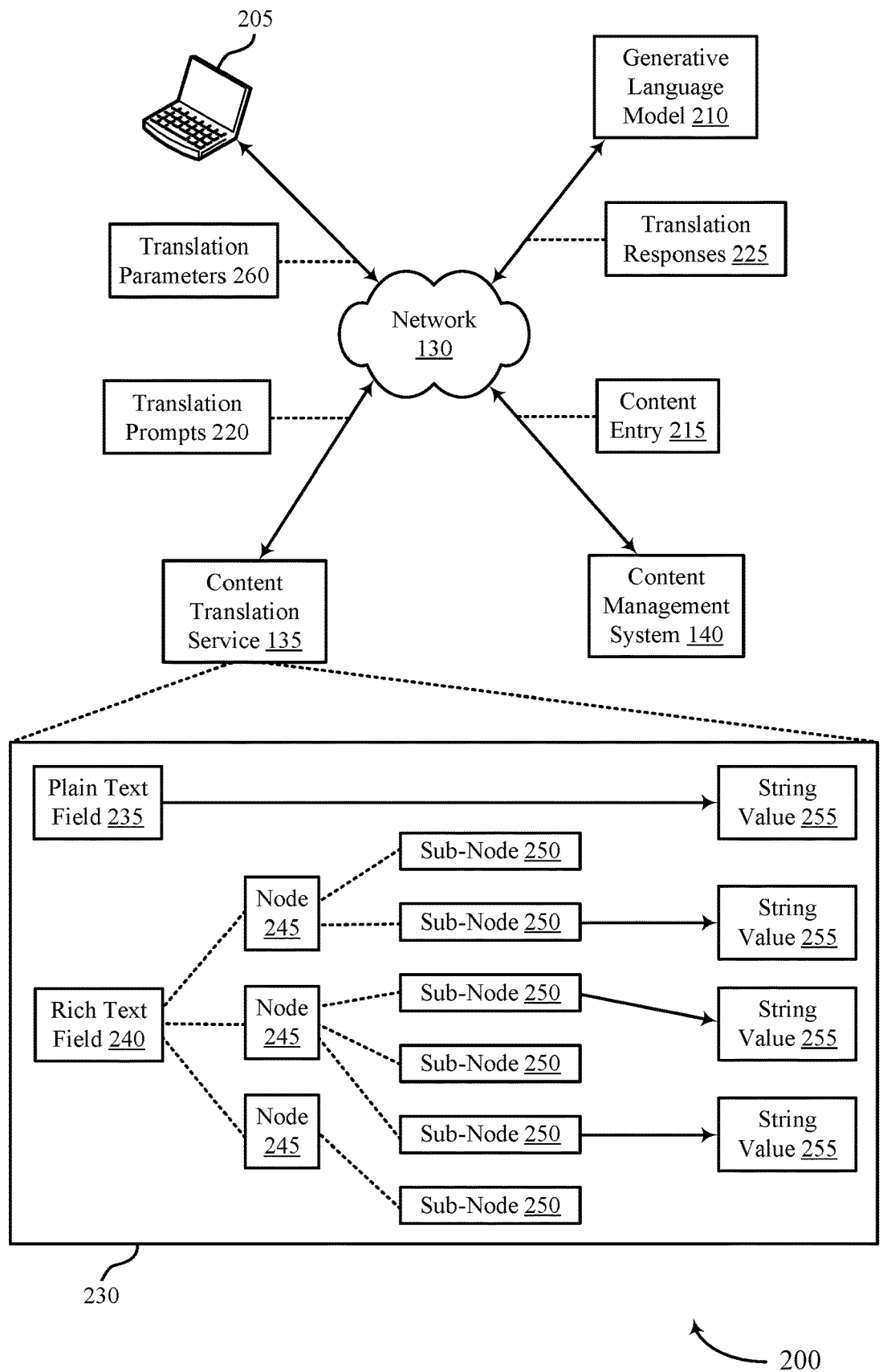

FIG. 2 shows an example of a system 200 that supports techniques for dynamically translating fields using a generative language model in accordance with aspects of the present disclosure. The system 200 may implement one or more aspects of the system 100. For example, the system 200 includes a network 130, a dynamic content translation service 135, and a content management system 140, which may be examples of corresponding elements described with reference to FIG. 1. The system 200 also includes a client device 205, which may be an example of a client device 105 described with reference to FIG. 1. In the example of FIG. 2, the dynamic content translation service 135 may use a generative language model 210 to translate plain text fields 235 and rich text fields 240 within a content entry 215.

As described herein, employees or administrative users of the identity management platform 115 may use the content management system 140 to create, publish, and/or update technical documentation (such as articles describing the use, functionality, or architecture of products, systems, and services provided by the identity management platform). The content management system 140 may enable users of the identity management platform 115 to create a content schema by defining a source code structure 230 that serves as a template for a particular type of content (such as a blog post, product, or article). The source code structure 230 of a content entry 215 includes fields that represent various elements of the content entry 215 (e.g., title, description, content). These fields may include a combination of plain text fields 235 and rich text fields 240. The content management system 140 may support multilingual content delivery, but administrators may have to manually input the translated content or purchase an integration that leverages third-party translation service(s). Thus, current methods of creating multilingual content may be expensive, manually intensive, time-consuming, and error prone.

In example of FIG. 2, the dynamic content translation service 135 of the identity management platform 115 may receive an indication of translation parameters 260 via a command line interface of the client device 205. The translation parameters 260 may include an entity identifier (such as a last fragment of a universal resource locator (URL) associated with the content entry 215), a set of field names (e.g., title, description, tags), and a designated language for translation. Upon receiving the translation parameters 260, the dynamic content translation service 135 may retrieve the content entry 215 from the content management system 140 (for example, using the entity identifier provided by the client device 205). In some implementations, the dynamic content translation service 135 may leverage a content management API of the content management system 140 to fetch model data (such as the source code structure 230) associated with the content entry 215.

Once the content entry 215 and associated metadata is retrieved from the content management system 140, the dynamic content translation service 135 may extract the desired/target fields from the content entry 215 based on the set of field names provided by the client device 205. The target fields may vary by type (e.g., Article, Navigation Item). The dynamic content translation service 135 may then analyze (e.g., parse, iterate through) the source code structure 230 of the content entry 215 to determine the type of each target field. For example, the dynamic content translation service 135 may determine that some of the target fields are associated with a first field type (e.g., plain text), while others are associated with a second field type (e.g., rich text). Thereafter, the dynamic content translation service 135 may extract source code string values 255 from the target fields and pass the source code string values 255 to the generative language model 210 via one or more translation prompts 220. In some implementations, the translation prompts 220 may be plain text prompts that instruct the generative language model 210 to translate the source code string values 255 to the designated language. The generative language model 210 may return translation responses 225 that include translations of the source code string values 255.

For plain text fields 235, the dynamic content translation service 135 may pass the corresponding source code string values 255 to the generative language model 210 and apply the resulting translations to the destination locale. Rich text fields 240, however, may include an array of nested abstract content nodes 245 that may or may not contain text. The dynamic content translation service 135 may recursively traverse the array and extract source code string values 255 from each text-matching sub-node 250 into a one-dimensional array. After translating the array of text fragments (for example, using the generative language model 210), the dynamic content translation service 135 may recursively traverse a clone of the rich text content nodes 245, applying each value of the translated array to the copied source code structure 230 in order. For larger rich text strings, the dynamic content translation service 135 may split the translation into logical chunks of text values (to avoid exceeding API limits of the generative language model 210), accumulating a single array of translated values before applying the results to the copied source code structure 230. The dynamic content translation service 135 may be configured to translate the text of complex field types such that the original source code structure 230 of the content entry 215 (including all pointers to images, code blocks, links, and the like) are preserved after translation.

Particular aspects of the system 200 can be implemented to realize one or more of the following potential advantages. The techniques described with reference to FIG. 2 may enable users of the content management system 140 (such as the client device 205) to dynamically translate source code string values 255 (such as text strings) within fields of the content entry 215, while preserving the underlying format and structure of the content entry 215. For example, the dynamic content translation service 135 may selectively translate complex field types (e.g., rich text fields 240) in such a way that all pointers to images, code blocks, and/or links within the fields are preserved/unaltered. Further, the described techniques may enable users of the content management system 140 to edit the translated text before the content entry 215 is saved or published, thereby providing users with the option to modify or update the translated text as needed.

Figure 3A:
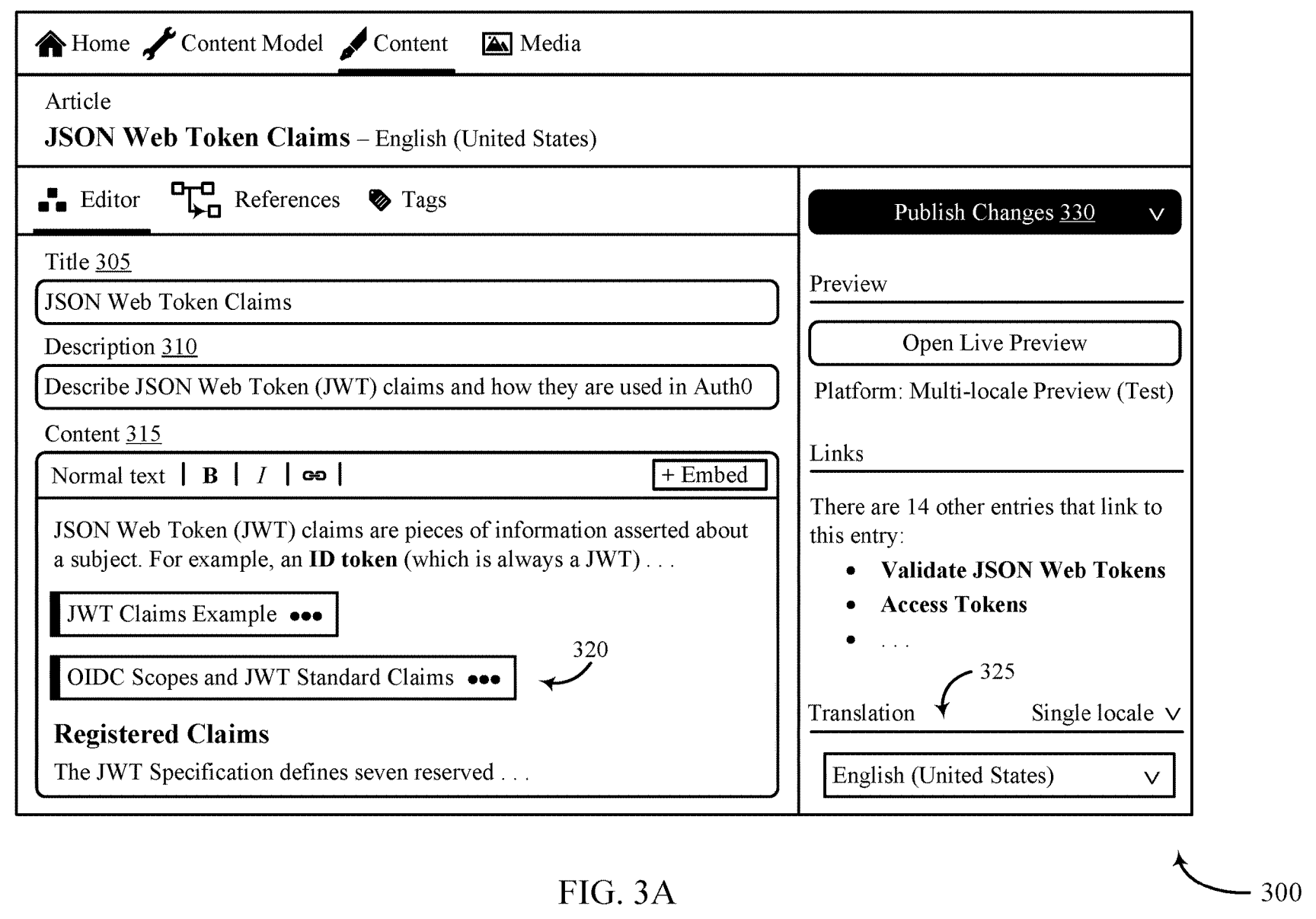
Figure 3B:
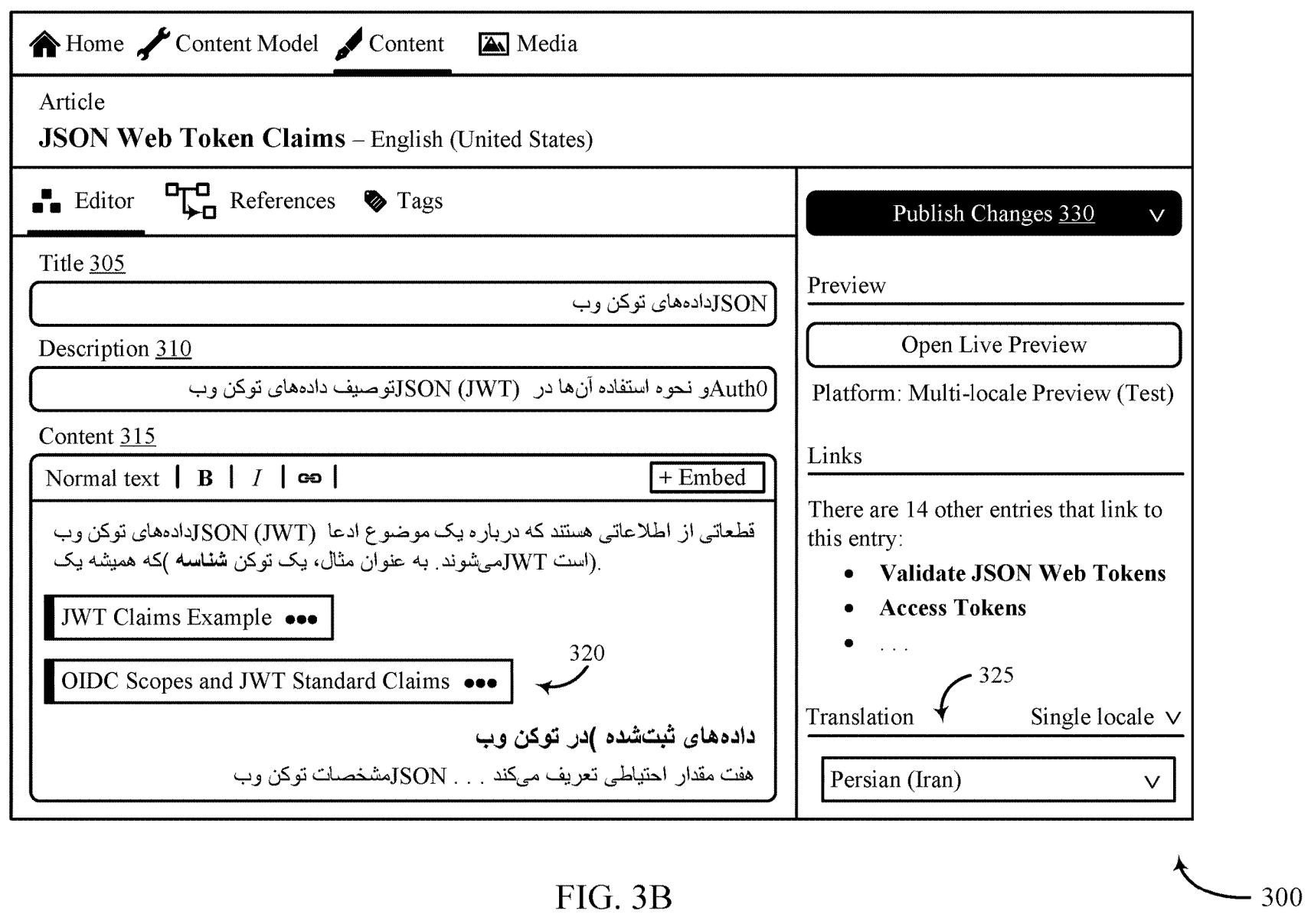

FIGS. 3A and 3B show examples of a user interface 300 that supports techniques for dynamically translating fields using a generative language model in accordance with aspects of the present disclosure. the user interface 300 may implement one or more aspects of the system 100 or the system 200. For example, the user interface 300 may be displayed or otherwise rendered on the client device 205, as shown and described with reference to FIG. 2. The user interface 300 may enable a user of the client device 205 to edit various fields of a content entry 215 associated with the content management system 140. The user interface 300 includes a title field 305, a description field 310, a content field 315, a translation menu 325, and an option 330 to publish changes to the content management system 140. The content field 315 may include dynamic content 320, such as pointers to images, code blocks, links, etc.

In the example of FIG. 3A, the title field 305, the description field 310, and the content field 315 may contain text associated with a source language (i.e., English). A user of the client device 205 may use a command line interface to configure or otherwise instruct the dynamic content translation service 135 to translate the title field 305, the description field 310, and the content field 315 of the content entry 215 from the source language to a designated/target language (such as Persian) using the generative language model 210. In some implementations, the user may configure a sandbox environment (such as a clone of a main environment) before initiating the dynamic field translation process. The user may also configure locales for each language to support, with fallbacks to a default language. In some examples, the user may enable localization of target fields beforehand.

In some implementations, the user may be provisioned with a content management API personal access token, which enables the dynamic content translation service 135 to access the content management system 140 via a content management API. The user may also be provisioned with an API key for the generative language model 210, which enables the dynamic content translation service 135 to access the generative language model 210. To begin the translation process, the user may browse for the content entry 215 and copy the entity identifier (such as the last fragment of a URL associated with the content entry 215) into the command line interface. Commands to the dynamic content translation service 135 may have the following format: "yarn translate <entity_id>:<fieldname1, fieldname2, . . . ><language>", where <entity_id> refers to the entity identifier of the content entry 215, <fieldname1, fieldname2, . . . > denotes the fields to be translated, and <language> refers to the designated language for translation.

To translate the title field 305, the description field 310, and the content field 315 of the content entry 215 from English to Persian (as shown in the example of FIG. 3B), the user may enter the following command: "yarn translate entity_id:title,description,content Persian". To translate only the content field 315 of the content entry 215 from English to Persian, the user may enter the following command: "yarn translate entity_id:content Persian". Once the dynamic content translation service 135 is finished translating the selected fields, the dynamic content translation service 135 may return a message to the user via the command line interface (such as "Entry updated with translated content"). Thereafter, the user can view the translated fields by interacting with the translation menu 325 via the user interface 300. As illustrated in the example of FIG. 3B, the structure/format of the dynamic content 320 within the content field 315 may be preserved/unaltered by the dynamic content translation service 135, ensuring that the dynamic content 320 behaves as expected.

Figure 4:
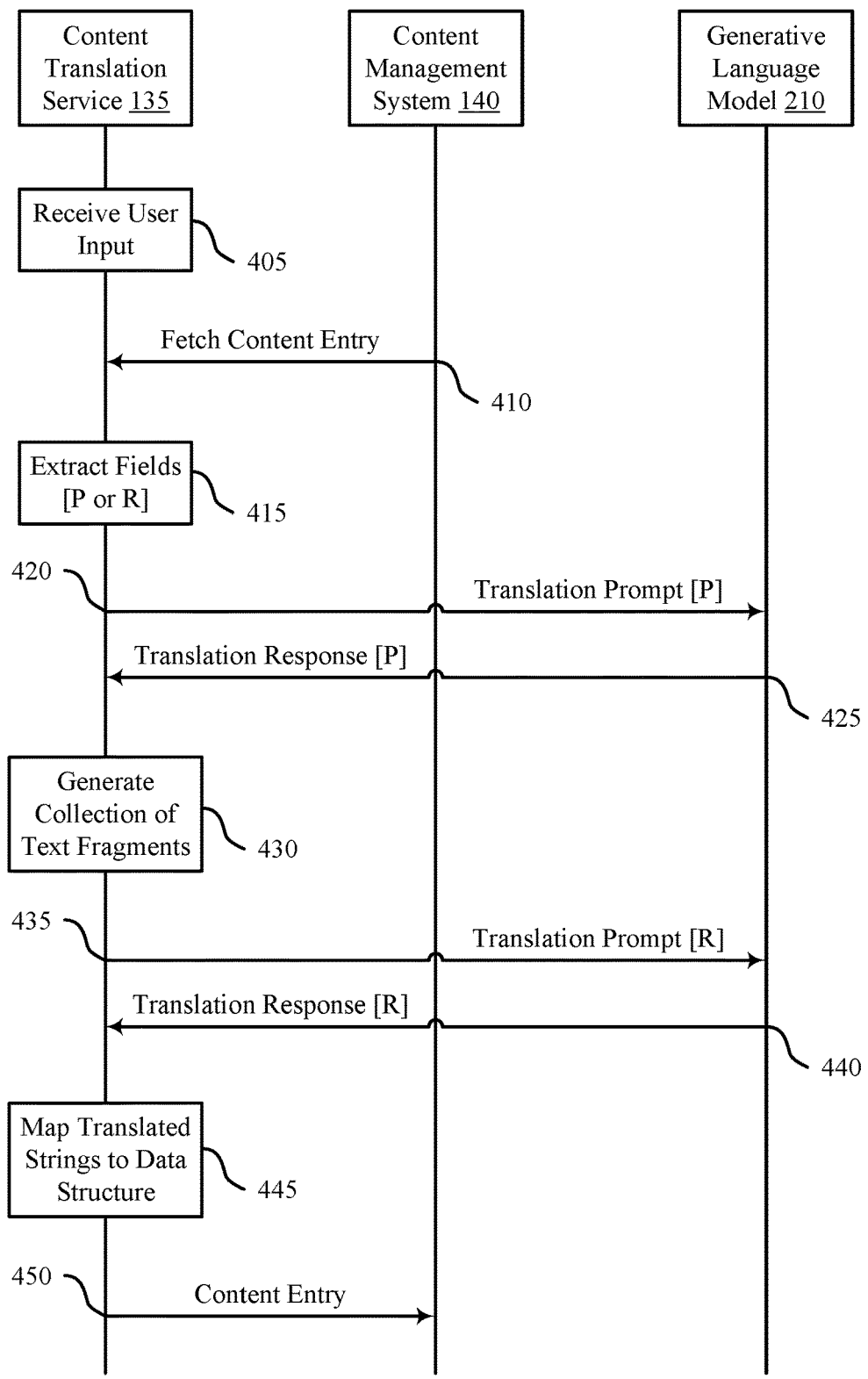
FIG. 4 shows an example of a process flow that supports techniques for dynamically translating fields using a generative language model in accordance with aspects of the present disclosure.

FIG. 4 shows an example of a process flow 400 that supports techniques for dynamically translating fields using a generative language model in accordance with aspects of the present disclosure. The process flow 400 may implement one or more aspects of the system 100, the system 200, and/or the user interface 300. For example, the process flow 400 includes a dynamic content translation service 135, a content management system 140, and a generative language model 210, which may be examples of corresponding elements described with reference to FIGS. 1 and 2. In the following description of the process flow 400, operations between the dynamic content translation service 135, the content management system 140, and the generative language model 210 may added, omitted, or performed in a different order (with respect to the exemplary order shown).

At 405, the dynamic content translation service 135 may receive an indication of translation parameters 260 via a command line interface of a client device 205. The translation parameters 260 may indicate a content entry 215 of the content management system 140, a set of fields within the content entry 215, and a designated language for translation of the selected fields. In some implementations, the translation parameters 260 may include an entity identifier of the content entry 215 (such as a last fragment of a URL associated with the content entry 215), a set of field names (i.e., description, title, tags), and a designated language identifier.

At 410, the dynamic content translation service 135 may fetch the content entry 215 from the content management system 140. In some implementations, the dynamic content translation service 135 may fetch the content entry 215 using a content management API of the content management system 140. At 415, the dynamic content translation service 135 may extract the selected fields from the content entry 215 and determine the type of each field (e.g., rich text or plain text) based on a source code structure 230 of the content entry 215. For example, the dynamic content translation service 135 may determine that a first subset of the selected fields are plain text fields 235 associated with a first field type and a second subset of the selected fields are rich text fields 240 associated with a second field type.

At 420, the dynamic content translation service 135 may extract or otherwise obtain a first set of source code string values 255 from the plain text fields 235 and pass the first set of source code string values 255 to the generative language model 210. In some implementations, the dynamic content translation service 135 may include the first set of source code string values 255 in a first set of translation prompts 220 and send the first set of translation prompts 220 to the generative language model 210 (via respective API calls to the generative language model 210). The one or more translation prompts 220 may instruct the generative language model 210 to translate the first set of source code string values 255 to the designated language. At 425, the generative language model 210 may return a first set of translation responses 225 to the dynamic content translation service 135. The first set of translation responses 225 may collectively include the first set of source code string values 255 translated to the designated language.

At 430, the dynamic content translation service 135 may extract or otherwise obtain a second set of source code string values 255 from the rich text fields 240. To obtain the second set of source code string values 255, the dynamic content translation service 135 may recursively iterate through one or more nodes 245 within the source code structure 230) of the content entry 215. The one or more nodes 245 may include multiple sub-nodes 250) which collectively include the second set of source code string values 255. In some implementations, the dynamic content translation service 135 may generate, for a first node 245 in the source code structure 230 of the content entry 215, a one-dimensional string array of source code string values 255 obtained from sub-nodes 250 of the first node 245. Some of the nodes 245 may not include any source code string values 255. Additionally, or alternatively, some of the nodes 245 may include pointers to images, code blocks, links, etc.

At 435, the dynamic content translation service 135 may include the second set of source code string values 255 in a second set of translation prompts 220 and send the second set of translation prompts 220 to the generative language model 210. Each of the translation prompts 220 may include a one-dimensional string array corresponding to a particular node 245 within a rich text field 240. Each element of the one-dimensional string array may include a source code string value 255 extracted/obtained from a sub-node 250 of the particular node 245. The dynamic content translation service 135 may include empty string arrays in translation prompts 220 for nodes 245 with 0 source code string values 255. In some implementations, the dynamic content translation service 135 may split one or more of the source code string values 255 into two or more blocks/chunks based on the size of the source code string values 255 and an API processing limit of the generative language model 210. The dynamic content translation service 135 may send these blocks/chunks to the generative language model 210 via separate API calls.

At 440, the generative language model 210) may return a second set of translation responses 225 to the dynamic content translation service 135. The second set of translation responses 225 may collectively include the second set of source code string values 255 translated to the designated language. Each translation response 225 may include a one-dimensional string array corresponding to a particular node 245 of a rich text field 240. Each element of the one-dimensional string array may include a translation of a source code string value 255 from a sub-node 250 of the particular node 245. In some implementations, each one-dimensional string array may be a JavaScript Object Notation (JSON)-parsable array of translated text fragments corresponding to the second set of source code string values 255.

At 445, the dynamic content translation service 135 may generate a duplicate (i.e., clone) of the source code structure 230 and sequentially insert the translated source code string values 255 into corresponding locations of the duplicate source code structure 230. For plain text fields 235, the dynamic content translation service 135 may apply (i.e., map) the translated source code string values 255 to corresponding plain text fields 235 of the duplicate source code structure 230. For rich text fields 240, the dynamic content translation service 135 may recursively iterate through the duplicate source code structure 230 and map the translated source code string values 255 to corresponding sub-nodes 250 of nodes 245 within the duplicate source code structure 230.

Once the translation is complete, the translated source code string values 255 may be editable within the content entry 215, such that a user of the client device 205 can edit or update the translated source code string values 255 via the user interface 300. At 450, the dynamic content translation service 135 may receive a request to store or save the content entry 215 (with the translated fields) to the content management system 140. For example, a user of the client device 205 may select the option 330 to publish changes, which may cause the client device 205 to send the translated content entry 215 to the content management system 140. In some implementations, the translated content entry 215 may be stored or saved in association with a particular location or locale. If a user associated with the particular location or locale requests the content entry 215, the content management system 140 may return the translated content entry 215 to the user.

Figure 5:
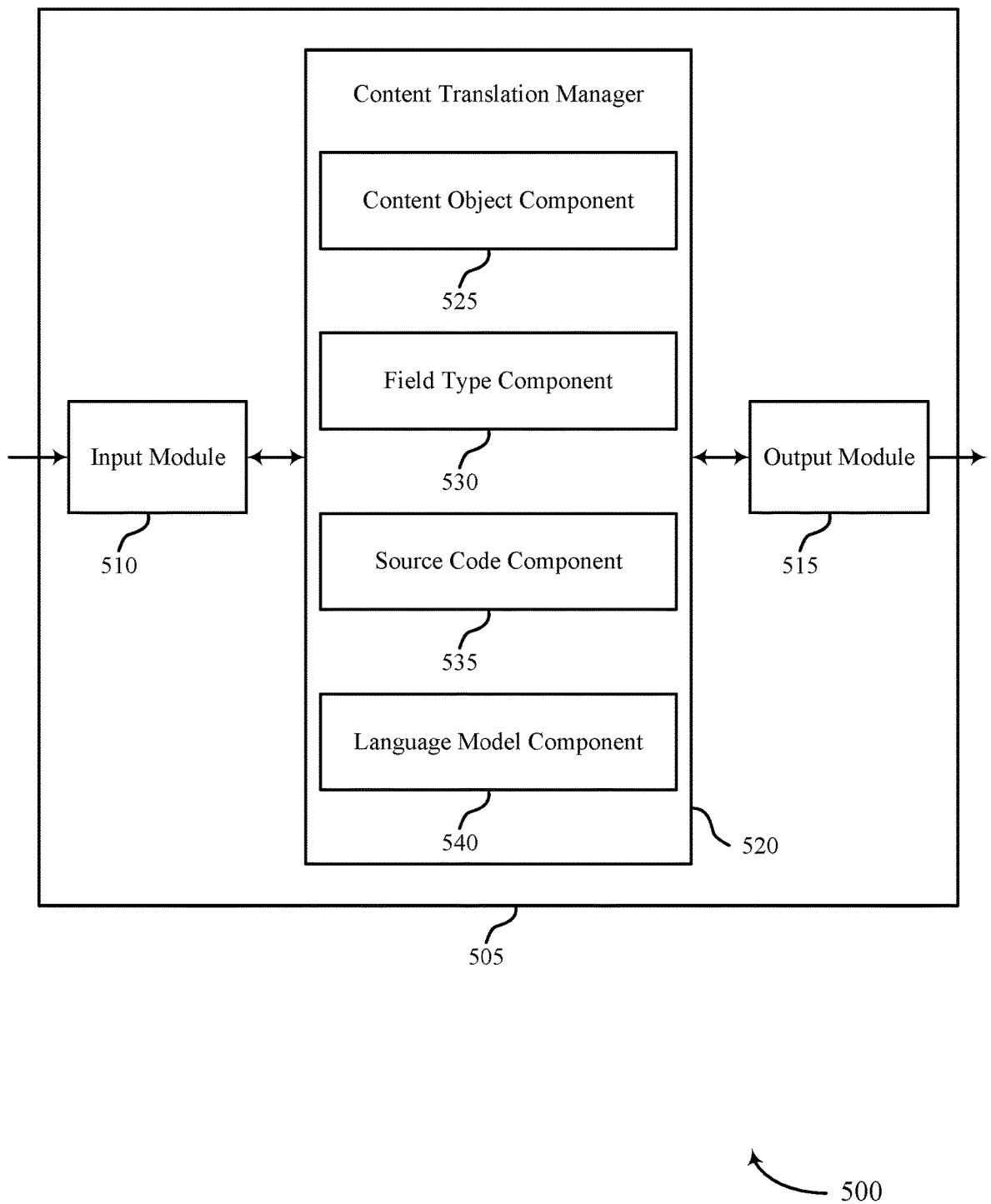
FIG. 5 shows a block diagram of an apparatus that supports techniques for dynamically translating fields using a generative language model in accordance with aspects of the present disclosure.

FIG. 5 shows a block diagram 500 of a device 505 that supports techniques for dynamically translating fields using a generative language model 210 in accordance with aspects of the present disclosure. The device 505 may implement one or more aspects of the client device 205 described with reference to FIG. 2. The device 505 may include an input module 510, an output module 515, and a content translation manager 520. The device 505, or one of more components of the device 505 (e.g., the input module 510, the output module 515, and the content translation manager 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the content translation manager 520 to support techniques for dynamically translating fields using a generative language model. In some cases, the input module 510 may be a component of an input/output (I/O) controller 710, as described with reference to FIG. 7.

The output module 515 may manage output signals for the device 505. For example, the output module 515 may receive signals from other components of the device 505, such as the content translation manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the content translation manager 520 may include a content entry component 525, a field type component 530, a source code component 535, a language model component 540, or any combination thereof. In some examples, the content translation manager 520, or various components thereof, may be configured to perform various operations (e.g., receiving, monitoring, transmitting) using or otherwise in cooperation with the input module 510, the output module 515, or both. For example, the content translation manager 520 may receive information from the input module 510, send information to the output module 515, or be integrated in combination with the input module 510, the output module 515, or both to receive information, transmit information, or perform various other operations as described herein.

The content translation manager 520 may support techniques for dynamically translating fields in accordance with examples disclosed herein. The content entry component 525 may be configured to or otherwise capable of receiving an indication of a content entry 215 associated with a content management system 140, multiple fields within the content entry 215, and a designated language for translation of the multiple fields within the content entry 215. The field type component 530 may be configured to or otherwise capable of determining that the multiple fields include a first set of fields associated with a first field type and a second set of fields associated with a second field type based on a source code structure 230 associated with the content entry 215 that includes the multiple fields. The source code component 535 may be configured to or otherwise capable of obtaining a first set of source code string values 255 from the first set of fields and a second set of source code string values 255 from the second set of fields based on iterating through the source code structure 230 associated with the content entry 215 that includes the multiple fields. The language model component 540 may be configured to or otherwise capable of translating the first set of fields and the second set of fields to the designated language based on using a generative language model 210 to process the first set of source code string values 255 obtained from the first set of fields and the second set of source code string values 255 obtained from the second set of fields.

Figure 6:
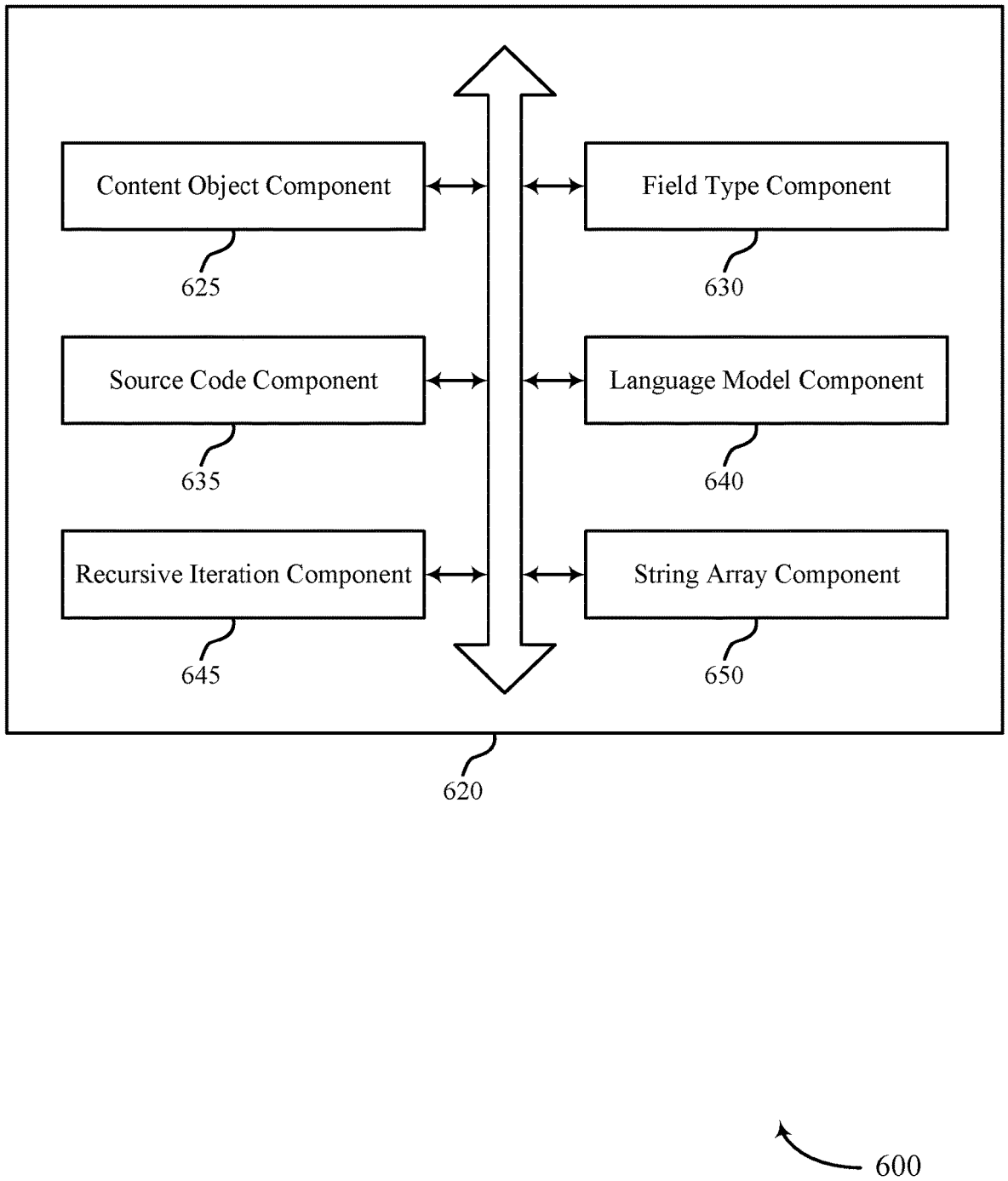
FIG. 6 shows a block diagram of a content translation manager that supports techniques for dynamically translating fields using a generative language model in accordance with aspects of the present disclosure.

FIG. 6 shows a block diagram 600 of a content translation manager 620 that supports techniques for dynamically translating fields using a generative language model 210 in accordance with aspects of the present disclosure. The content translation manager 620 may be an example of aspects of a content translation manager or a content translation manager 520, or both, as described herein. The content translation manager 620, or various components thereof, may be an example of means for performing various aspects of techniques for dynamically translating fields using a generative language model 210 as described herein. For example, the content translation manager 620 may include a content entry component 625, a field type component 630, a source code component 635, a language model component 640, a recursive iteration component 645, a string array component 650, or any combination thereof. Each of these components, or components of subcomponents thereof (e.g., one or more processors, one or more memories), may communicate, directly or indirectly, with one another (e.g., via one or more buses).

The content translation manager 620 may support techniques for dynamically translating fields in accordance with examples disclosed herein. The content entry component 625 may be configured to or otherwise capable of receiving an indication of a content entry 215 associated with a content management system 140, multiple fields within the content entry 215, and a designated language for translation of the multiple fields within the content entry 215. The field type component 630 may be configured to or otherwise capable of determining that the multiple fields include a first set of fields associated with a first field type and a second set of fields associated with a second field type based on a source code structure 230 associated with the content entry 215 that includes the multiple fields. The source code component 635 may be configured to or otherwise capable of obtaining a first set of source code string values 255 from the first set of fields and a second set of source code string values 255 from the second set of fields based on iterating through the source code structure 230 associated with the content entry 215 that includes the multiple fields. The language model component 640 may be configured to or otherwise capable of translating the first set of fields and the second set of fields to the designated language based on using a generative language model 210 to process the first set of source code string values 255 obtained from the first set of fields and the second set of source code string values 255 obtained from the second set of fields.

In some examples, to support obtaining the second set of source code string values 255, the recursive iteration component 645 may be configured to or otherwise capable of recursively iterating through one or more nodes 245 within the source code structure 230 of the content entry 215 that includes the multiple fields, the one or more nodes 245 including multiple sub-nodes 250 which collectively include the second set of source code string values 255.

In some examples, at least the first set of source code string values 255 and the second set of source code string values 255 are editable within the content entry 215 after the first set of fields and the second set of fields are translated to the designated language.

In some examples, to support translating the second set of fields to the designated language, the string array component 650 may be configured to or otherwise capable of generating, for a first node 245 in the source code structure 230 of the content entry 215, a one-dimensional string array of source code string values 255 obtained from sub-nodes 250 of the first node 245.

In some examples, the first node 245 includes one or more image pointers, code blocks, or virtual resource identifiers that are unaltered after translation.

In some examples, to support translating the second set of fields, the string array component 650 may be configured to or otherwise capable of transmitting a message that includes the one-dimensional string array of source code string values 255 obtained from sub-nodes 250 of the first node 245 within the source code structure 230 of the content entry 215.

In some examples, the message includes a plain text prompt that instructs the generative language model 210 to translate the one-dimensional string array of source code string values 255 to the designated language.

In some examples, the string array component 650 may be configured to or otherwise capable of including an empty string array in a call to the generative language model 210 based on determining that at least one node 245 includes zero (0) source code string values 255.

In some examples, the source code component 635 may be configured to or otherwise capable of splitting at least one source code string value 255 into two or more blocks based on a size of the at least one source code string value 255 and a processing limit of the generative language model 210. In some examples, the language model component 640 may be configured to or otherwise capable of including the two or more blocks in separate calls to the generative language model 210.

In some examples, to support translating the first set of fields and the second set of fields, the source code component 635 may be configured to or otherwise capable of receiving a first set of messages including the first set of source code string values 255 translated to the designated language. In some examples, to support translating the first set of fields and the second set of fields, the language model component 640 may be configured to or otherwise capable of receiving a second set of messages including the second set of source code string values 255 translated to the designated language, where the first set of source code string values 255 and the second set of source code string values 255 are translated using the generative language model 210.

In some examples, the second set of messages includes multiple one-dimensional string arrays which include translations of the second set of source code string values 255. In some examples, a one-dimensional string array corresponds to a node 245 within a field of the second field type. In some examples, each element of the one-dimensional string array includes a translation of a source code string value 255 obtained from a sub-node 250 of the node 245.

In some examples, the source code component 635 may be configured to or otherwise capable of generating a duplicate node 245 based on metadata associated with the field including the node 245. In some examples, the source code component 635 may be configured to or otherwise capable of sequentially inserting translated source code string values 255 from the one-dimensional string array into corresponding sub-nodes 250 of the duplicate node 245 based on recursively iterating through corresponding sub-nodes 250 of the duplicate node 245.

In some examples, the content entry component 625 may be configured to or otherwise capable of receiving, from a device 505, a request to store the content entry 215 after the first set of fields and the second set of fields are translated to the designated language. In some examples, the content entry component 625 may be configured to or otherwise capable of generating two or more versions of the content entry 215 based on translating the multiple fields to multiple languages associated with different locales.

In some examples, the content entry component 625 may be configured to or otherwise capable of receiving, from a device 505 associated with a client of the content management system 140, a request for the content entry 215. In some examples, the content entry component 625 may be configured to or otherwise capable of returning one of the two or more versions of the content entry 215 to the device 505 based on a locale of the client.

Figure 7:
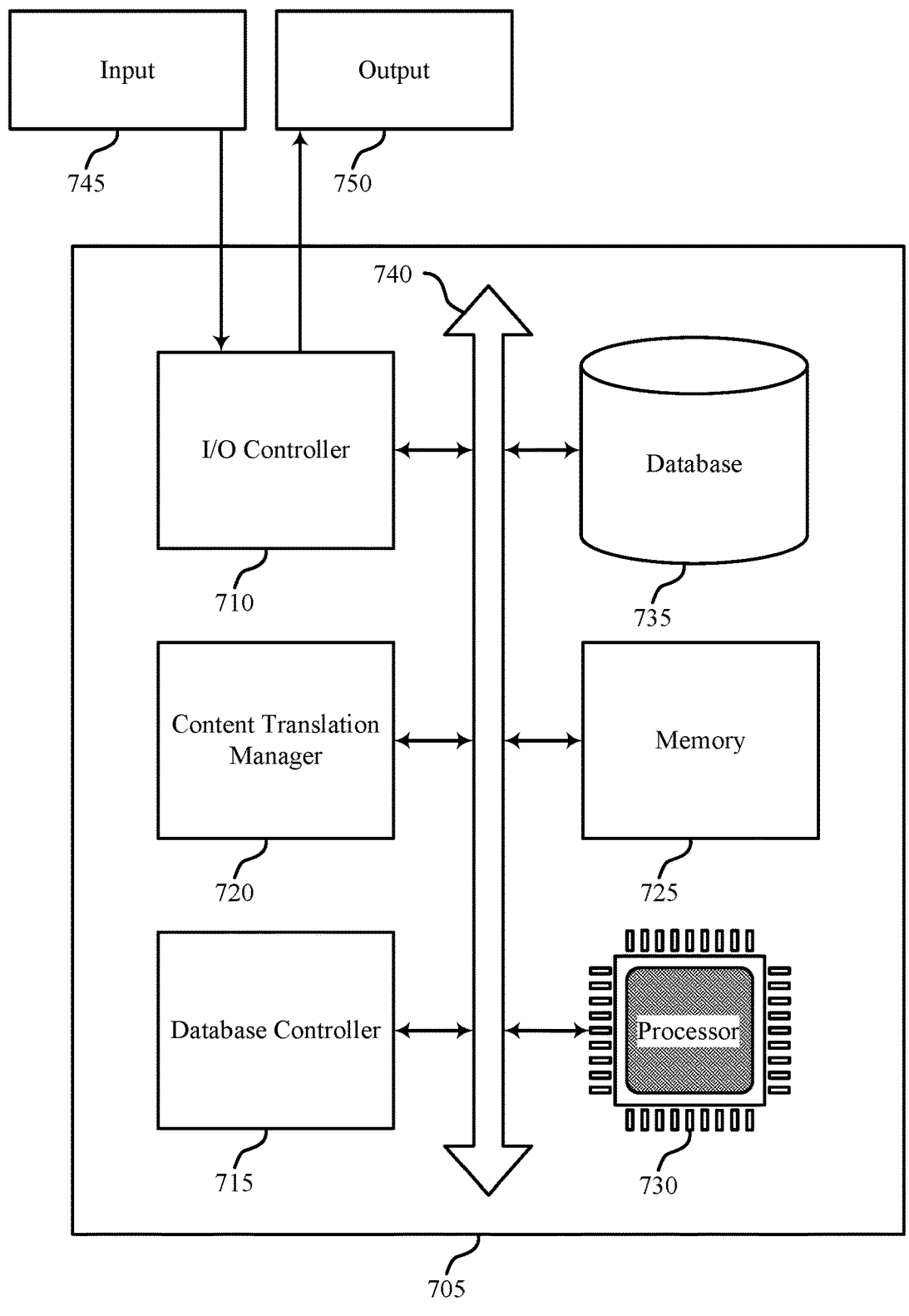
FIG. 7 shows a diagram of a system including a device that supports techniques for dynamically translating fields using a generative language model in accordance with aspects of the present disclosure.

FIG. 7 shows a diagram of a system 700 including a device 705 that supports techniques for dynamically translating fields using a generative language model 210 in accordance with aspects of the present disclosure. The device 705 may be an example of or include the components of a device 505 as described herein. The device 705 may include components for bi-directional data communications including components for transmitting and receiving communications, such as a content translation manager 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS), which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730) may be configured to execute computer-readable instructions stored in at least one memory 725 to perform various functions (e.g., functions or tasks supporting techniques for dynamically translating fields using a generative language model 210). The processor 730 may be an example of a single processor or multiple processors. For example, the device 705 may include one or more processors 730.

The content translation manager 720 may support data processing in accordance with examples as disclosed herein. For example, the content translation manager 720 may be configured to or otherwise capable of receiving an indication of a content entry 215 associated with a content management system 140, multiple fields within the content entry 215, and a designated language for translation of the multiple fields within the content entry 215. The content translation manager 720) may be configured to or otherwise capable of determining that the multiple fields include a first set of fields associated with a first field type and a second set of fields associated with a second field type based on a source code structure 230) associated with the content entry 215 that includes the multiple fields. The content translation manager 720) may be configured to or otherwise capable of obtaining a first set of source code string values 255 from the first set of fields and a second set of source code string values 255 from the second set of fields based on iterating through the source code structure 230) associated with the content entry 215 that includes the multiple fields. The content translation manager 720 may be configured to or otherwise capable of translating the first set of fields and the second set of fields to the designated language based on using a generative language model 210 to process the first set of source code string values 255 obtained from the first set of fields and the second set of source code string values 255 obtained from the second set of fields.

Figure 8:
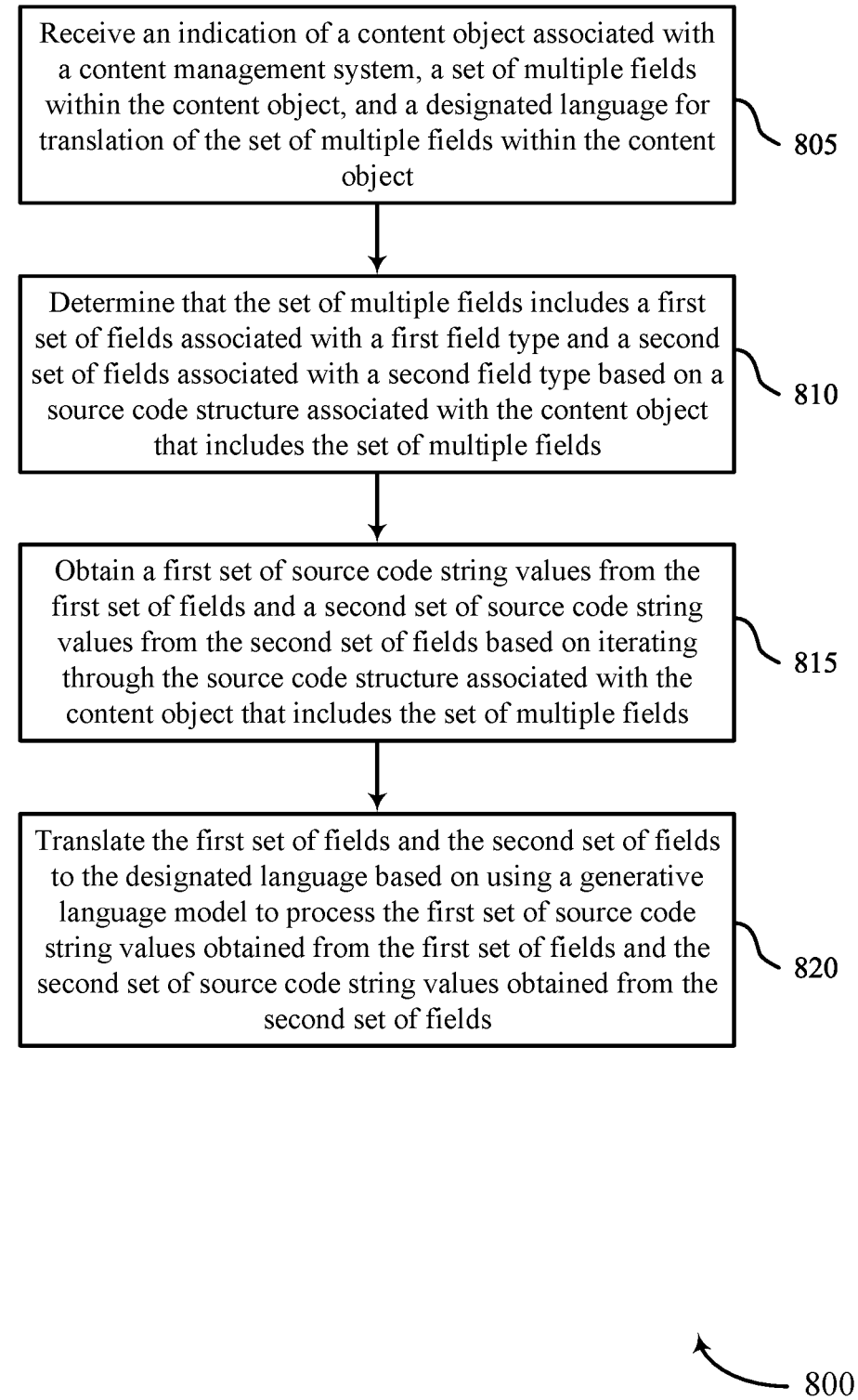
FIG. 8 shows a flowchart illustrating methods that support techniques for dynamically translating fields using a generative language model in accordance with aspects of the present disclosure.

FIG. 8 shows a flowchart illustrating a method 800 for dynamically translating fields using a generative language model 210 in accordance with aspects of the present disclosure. In some examples, the method 800 may be implemented (at least in part) by the dynamic content translation service 135, as shown and described with reference to FIGS. 1 through 4. In some examples, the dynamic content translation service 135 may execute a set of instructions to control the functional elements of the dynamic content translation service 135 to perform the described functions. Additionally, or alternatively, the dynamic content translation service 135 may perform aspects of the described functions using special-purpose hardware.

At 805, the dynamic content translation service 135 may receive an indication of a content entry 215 associated with a content management system 140, multiple fields within the content entry 215, and a designated language for translation of the multiple fields within the content entry 215. In some examples, aspects of the operations of 805 may be performed by a content entry component 625, as described with reference to FIG. 6.

At 810, the dynamic content translation service 135 may determine that the multiple fields include a first set of fields associated with a first field type and a second set of fields associated with a second field type based on a source code structure 230 associated with the content entry 215 that includes the multiple fields. In some examples, aspects of the operations of 810 may be performed by a field type component 630, as described with reference to FIG. 6.

At 815, the dynamic content translation service 135 may obtain a first set of source code string values 255 from the first set of fields and a second set of source code string values 255 from the second set of fields based on iterating through the source code structure 230 associated with the content entry 215 that includes the multiple fields. In some examples, aspects of the operations of 815 may be performed by a source code component 635, as described with reference to FIG. 6.

At 820, the dynamic content translation service 135 may translate the first set of fields and the second set of fields to the designated language based on using a generative language model 210 to process the first set of source code string values 255 obtained from the first set of fields and the second set of source code string values 255 obtained from the second set of fields. In some examples, aspects of the operations of 820 may be performed by a language model component 640, as described with reference to FIG. 6.

The following provides an overview of aspects of the present disclosure:

Aspect 1: A method for data processing at a dynamic content translation service, comprising: receiving an indication of a content entry associated with a content management system, a plurality of fields within the content entry, and a designated language for translation of the plurality of fields within the content entry; determining that the plurality of fields include a first set of fields associated with a first field type and a second set of fields associated with a second field type based at least in part on a source code structure associated with the content entry that includes the plurality of fields; obtaining a first set of source code string values from the first set of fields and a second set of source code string values from the second set of fields based at least in part on iterating through the source code structure associated with the content entry that includes the plurality of fields; and translating the first set of fields and the second set of fields to the designated language based at least in part on using a generative language model to process the first set of source code string values obtained from the first set of fields and the second set of source code string values obtained from the second set of fields.

Aspect 2: The method of aspect 1, wherein obtaining the second set of source code string values comprises: recursively iterating through one or more nodes within the source code structure of the content entry that includes the plurality of fields, the one or more nodes comprising a plurality of sub-nodes which collectively include the second set of source code string values.

Aspect 3: The method of any of aspects 1 through 2, wherein at least the first set of source code string values and the second set of source code string values are editable within the content entry after the first set of fields and the second set of fields are translated to the designated language.

Aspect 4: The method of any of aspects 1 through 3, wherein translating the second set of fields to the designated language comprises: generating, for a first node in the source code structure of the content entry, a one-dimensional string array of source code string values obtained from sub-nodes of the first node.

Aspect 5: The method of aspect 4, wherein the first node comprises one or more image pointers, code blocks, or virtual resource identifiers that are unaltered after translation.

Aspect 6: The method of any of aspects 4 through 5, wherein translating the second set of fields comprises: transmitting a message that includes the one-dimensional string array of source code string values obtained from sub-nodes of the first node within the source code structure of the content entry.

Aspect 7: The method of aspect 6, wherein the message includes a plain text prompt that instructs the generative language model to translate the one-dimensional string array of source code string values to the designated language.

Aspect 8: The method of any of aspects 1 through 7, further comprising: including an empty string array in a call to the generative language model based at least in part on determining that at least one node includes zero (0) source code string values.

Aspect 9: The method of any of aspects 1 through 8, further comprising: splitting at least one source code string value into two or more blocks based at least in part on a size of the at least one source code string value and a processing limit of the generative language model; and including the two or more blocks in separate calls to the generative language model.

Aspect 10: The method of any of aspects 1 through 9, wherein translating the first set of fields and the second set of fields comprises: receiving a first set of messages comprising the first set of source code string values translated to the designated language; and receiving a second set of messages comprising the second set of source code string values translated to the designated language, wherein the first set of source code string values and the second set of source code string values are translated using the generative language model.

Aspect 11: The method of aspect 10, wherein the second set of messages comprises a plurality of one-dimensional string arrays which includes translations of the second set of source code string values.

Aspect 12: The method of aspect 11, wherein a one-dimensional string array of the plurality of one-dimensional string arrays corresponds to a node within a field of the second field type; and each element of the one-dimensional string array comprises a translation of a source code string value obtained from a sub-node of the node.

Aspect 13: The method of aspect 12, further comprising: generating a duplicate node based at least in part on metadata associated with the field comprising the node; and sequentially inserting translated source code string values from the one-dimensional string array into corresponding sub-nodes of the duplicate node based at least in part on recursively iterating through the corresponding sub-nodes of the duplicate node.

Aspect 14: The method of any of aspects 1 through 13, further comprising: receiving, from a device, a request to store the content entry after the first set of fields and the second set of fields are translated to the designated language.

Aspect 15: The method of any of aspects 1 through 14, further comprising: generating two or more versions of the content entry based at least in part on translating the plurality of fields to a plurality of languages associated with different locales.

Aspect 16: The method of aspect 15, further comprising: receiving, from a device associated with a client of the content management system, a request for the content entry; and returning one of the two or more versions of the content entry to the device based at least in part on a locale of the client.

Aspect 17: An apparatus for data processing at a dynamic content translation service, comprising one or more memories storing processor-executable code, and one or more processors coupled with the one or more memories, wherein the one or more processors are individually or collectively operable to execute the code to cause the device to perform a method of any of aspects 1 through 16.

Aspect 18: An apparatus for data processing at a dynamic content translation service, comprising at least one means for performing a method of any of aspects 1 through 16.

Aspect 19: A non-transitory computer-readable medium storing code for data processing at a dynamic content translation service, the code comprising instructions executable by one or more processors to perform a method of any of aspects 1 through 16.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a dynamic content translation service, comprising:
    receiving an indication of a content entry associated with a content management system, a plurality of fields within the content entry, and a designated language for translation of the plurality of fields within the content entry;
    determining that the plurality of fields include a first set of fields associated with a first field type and a second set of fields associated with a second field type based at least in part on a source code structure associated with the content entry that includes the plurality of fields;
    obtaining a first set of source code string values from the first set of fields and a second set of source code string values from the second set of fields based at least in part on iterating through the source code structure associated with the content entry that includes the plurality of fields; and
    translating the first set of fields and the second set of fields to the designated language based at least in part on using a generative language model to process the first set of source code string values obtained from the first set of fields and the second set of source code string values obtained from the second set of fields.

2. The method of claim 1, wherein obtaining the second set of source code string values comprises:
    recursively iterating through one or more nodes within the source code structure of the content entry that includes the plurality of fields, the one or more nodes comprising a plurality of sub-nodes which collectively include the second set of source code string values.

3. The method of claim 1, wherein at least the first set of source code string values and the second set of source code string values are editable within the content entry after the first set of fields and the second set of fields are translated to the designated language.

4. The method of claim 1, wherein translating the second set of fields to the designated language comprises:
    generating, for a first node in the source code structure of the content entry, a one-dimensional string array of source code string values obtained from sub-nodes of the first node.

5. The method of claim 4, wherein the first node comprises one or more image pointers, code blocks, or virtual resource identifiers that are unaltered after translation.

6. The method of claim 4, wherein translating the second set of fields comprises:
    transmitting a message that includes the one-dimensional string array of source code string values obtained from sub-nodes of the first node within the source code structure of the content entry.

7. The method of claim 6, wherein the message includes a plain text prompt that instructs the generative language model to translate the one-dimensional string array of source code string values to the designated language.

8. The method of claim 1, further comprising:
    including an empty string array in a call to the generative language model based at least in part on determining that at least one node includes zero (0) source code string values.

9. The method of claim 1, further comprising:
    splitting at least one source code string value into two or more blocks based at least in part on a size of the at least one source code string value and a processing limit of the generative language model; and
    including the two or more blocks in separate calls to the generative language model.

10. The method of claim 1, wherein translating the first set of fields and the second set of fields comprises:
    receiving a first set of messages comprising the first set of source code string values translated to the designated language; and
    receiving a second set of messages comprising the second set of source code string values translated to the designated language, wherein the first set of source code string values and the second set of source code string values are translated using the generative language model.

11. The method of claim 10, wherein the second set of messages comprises a plurality of one-dimensional string arrays which includes translations of the second set of source code string values.

12. The method of claim 11, wherein:
    a one-dimensional string array of the plurality of one-dimensional string arrays corresponds to a node within a field of the second field type; and
    each element of the one-dimensional string array comprises a translation of a source code string value obtained from a sub-node of the node.

13. The method of claim 12, further comprising:
    generating a duplicate node based at least in part on metadata associated with the field comprising the node; and
    sequentially inserting translated source code string values from the one-dimensional string array into corresponding sub-nodes of the duplicate node based at least in part on recursively iterating through the corresponding sub-nodes of the duplicate node.

14. The method of claim 1, further comprising:
    receiving, from a device, a request to store the content entry after the first set of fields and the second set of fields are translated to the designated language.

15. The method of claim 1, further comprising:
    generating two or more versions of the content entry based at least in part on translating the plurality of fields to a plurality of languages associated with different locales.

16. The method of claim 15, further comprising:
    receiving, from a device associated with a client of the content management system, a request for the content entry; and
    returning one of the two or more versions of the content entry to the device based at least in part on a locale of the client.

17. An apparatus for data processing at a dynamic content translation service, comprising:
    one or more memories storing processor-executable code; and
    one or more processors coupled with the one or more memories and individually or collectively operable to execute the code to cause the apparatus to:
        receive an indication of a content entry associated with a content management system, a plurality of fields within the content entry, and a designated language for translation of the plurality of fields within the content entry;
        determine that the plurality of fields include a first set of fields associated with a first field type and a second set of fields associated with a second field type based at least in part on a source code structure associated with the content entry that includes the plurality of fields;

obtain a first set of source code string values from the first set of fields and a second set of source code string values from the second set of fields based at least in part on iterating through the source code structure associated with the content entry that includes the plurality of fields; and translate the first set of fields and the second set of fields to the designated language based at least in part on using a generative language model to process the first set of source code string values obtained from the first set of fields and the second set of source code string values obtained from the second set of fields.

18. The apparatus of claim 17, wherein, to obtain the second set of source code string values, the one or more processors are individually or collectively operable to execute the code to cause the apparatus to:

recursively iterate through one or more nodes within the source code structure of the content entry that includes the plurality of fields, the one or more nodes comprising a plurality of sub-nodes which collectively include the second set of source code string values.

19. The apparatus of claim 17, wherein at least the first set of source code string values and the second set of source code string values are editable within the content entry after the first set of fields and the second set of fields are translated to the designated language.

20. A non-transitory computer-readable medium storing code for data processing at a dynamic content translation service, the code comprising instructions executable by one or more processors to:

receive an indication of a content entry associated with a content management system, a plurality of fields within the content entry, and a designated language for translation of the plurality of fields within the content entry;

determine that the plurality of fields include a first set of fields associated with a first field type and a second set of fields associated with a second field type based at least in part on a source code structure associated with the content entry that includes the plurality of fields;

obtain a first set of source code string values from the first set of fields and a second set of source code string values from the second set of fields based at least in part on iterating through the source code structure associated with the content entry that includes the plurality of fields; and translate the first set of fields and the second set of fields to the designated language based at least in part on using a generative language model to process the first set of source code string values obtained from the first set of fields and the second set of source code string values obtained from the second set of fields.

* * * * *